(12) United States Patent
Gregory et al.

(10) Patent No.: US 8,363,055 B1
(45) Date of Patent: Jan. 29, 2013

(54) MULTIPLE TIME SCALES IN COMPUTER GRAPHICS

(75) Inventors: Eric Gregory, Larkspur, CA (US); Michael Ferris, Sunnyvale, CA (US); Robert Jensen, Berkeley, CA (US); Oren Jacob, Piedmont, CA (US); Timothy S. Milliron, Menlo Park, CA (US)

(73) Assignee: Pixar, Emeryville, CA (US)

( * ) Notice: Subject to any disclaimer, the term of this patent is extended or adjusted under 35 U.S.C. 154(b) by 1107 days.

(21) Appl. No.: 12/272,997

(22) Filed: Nov. 18, 2008

(51) Int. Cl.
*G06T 11/00* (2006.01)
(52) U.S. Cl. ........................................ 345/473; 345/474
(58) Field of Classification Search .................. 345/473, 345/474
See application file for complete search history.

(56) References Cited

U.S. PATENT DOCUMENTS 6,097,381 A * 8/2000 Scott et al. .................... 715/203

OTHER PUBLICATIONS

Hamsa Suri, Beginning Game Programming with Flash, Dec. 2007.*
Anonymous, Basics of Flash, http://web.archive.org/web/20050507142629/http://www.smartwebby.com/Flash/flash_animations.asp, May 7, 2005.*

* cited by examiner

*Primary Examiner* — Aaron M Richer
*Assistant Examiner* — Robert Craddock
(74) *Attorney, Agent, or Firm* — Patterson & Sheridan, LLP

(57) ABSTRACT

Multiple time scales enable animations over multiple shots. Time-dependent data is specified with reference to time references. Data expressed in different time references may be combined to form animations, shots, and sequences of shots. Time transformations specifying mappings between time references are used to combine data expressed in different time references. Data can be viewed in arbitrary time references. Editing data specifying a sequence of shots may be used as a time reference for viewing data expressed in other time references. Data expressed in one time reference may be rearranged according to another time reference to indicate time reference relationships. Data authored in one time reference may be viewed and modified in another time reference. Modifications are converted from the viewing time reference to the data's original time reference for updating data. Time-dependent data may be expressed in layer data structures. Layer relationships may include time transformations.

11 Claims, 10 Drawing Sheets

US 8,363,055 B1

MULTIPLE TIME SCALES IN COMPUTER GRAPHICS

BACKGROUND

The present invention relates to the field of computer graphics, and in particular to methods and apparatus for creating animated sequences. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Typically, live-action and animated films are comprised of a number of shots that have been edited together into specific sequence. A shot is a sequence of footage or animation that runs for an uninterrupted period of time. A shot is typically created from a single camera viewpoint. The primary subject of a shot and the distance of the camera viewpoint to the subject determines the narrative qualities of the shot. Editors arrange shots to create sequences that form the entire film. Editor often cut or edit the length of shots when creating sequences. Editing is a crucial aspect of film-making and can greatly influence the style, pacing, emotion, and narrative effect of a film.

Traditionally, animation is extensively planned in advanced, often using storyboards or preliminary sketches. This planning often roughly defines the shots to be created. Animators are then assigned to create specific shots. Shots are typically created separately. After the shots are animated and rendered, editors then fine tune the pacing and sequencing of the animated shots to create the final animated film.

Because animation is typically created from separate, individually animated shots, artistic flexibility is limited. After creating an initial sequence from a set of shots, if an editor or director decides to add a different type of shot to a sequence or to drastically resequence the shots, animators often have to create new shots from scratch. Additionally, many sequences contain common elements or animations shown from different viewpoints. With current animation tools, once a common animation has been split into multiple shots, it is difficult to modify the common elements or animations and propagate these changes to multiple separate shots.

Therefore, there is an unmet need for computer graphics animation software tools to allow users to create, modify, and manipulate animations over multiple shots.

SUMMARY

An embodiment of the invention enables users to create animations over multiple shots by introducing the concept of multiple time scales. Time-dependent data, such as animation data or time-varying parameters, is specified with reference to one or more time references. Different time references may be used to express data. Data expressed in different time references may be combined to form animations, shots, and sequences of shots.

In an embodiment, time transformations including linear and non-linear mappings between different time references are used to combine data expressed in different time references. Additionally, data can be viewed in one or more arbitrary time references using time transformations, regardless of which time reference is used to originally author the data.

In an embodiment, editing data, specifying a sequence of shots, may be used as a time reference for viewing data expressed in shot and data specific time references. Additionally, data expressed in one time reference may be rearranged according to another time reference to provide a visual indication of the relationship between these time references and their associated data.

Data authored in one time reference may be viewed and modified in another time reference. In an embodiment, modified data is converted from the viewing time reference to the time reference originally used to express the data. The modified and converted data is used to update data in its original time reference. This allows modifications to shared data, such as animations shared by multiple shots, to propagate everywhere it may be used.

In a further embodiment, time-dependent data may be expressed in layer data structures using layer-specific time references. Layer relationships associating layer data structures together may include time transformations specifying the relationships between time references in different layers.

BRIEF SUMMARY OF THE DRAWINGS

The invention will be described with reference to the drawings, in which.

In the drawings, identical reference numbers indicate identical components.

DETAILED DESCRIPTION OF THE INVENTION

An embodiment of the invention enables users to create animations over multiple shots by introducing the concept of multiple time scales. As discussed in detail below, different portions of a sequence may have different measurements of time, or time references. For example, if a user creates a shared animated sequence to be used in multiple shots, this sequence may have its own internal time reference used to specify its animation. When this common animation is incorporated into a specific shot, the shot will have its own time reference, which may be offset, scaled, and/or non-linearly transformed from the time reference of the common animation. Different shots may incorporate a common animation sequence, each with different, independent time references. Further, when shots are combined into a sequence, the sequence has its own time reference, representing the running time of the sequence. The time reference within a sequence is independent of the time reference of each of its shots and any incorporated shared resources.

Figure 1:
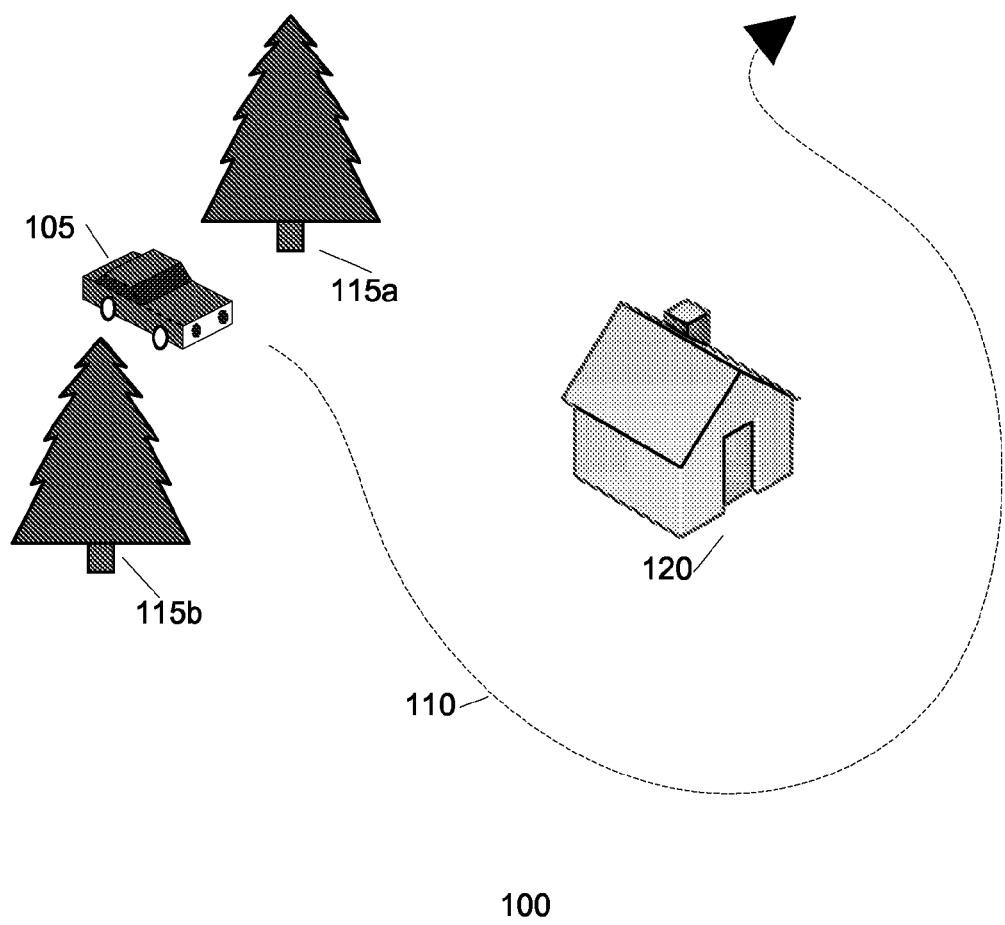
FIG. 1 illustrates an example animated sequence to demonstrate aspects of embodiments of the invention.

FIG. 1 illustrates an example animated sequence 100 to demonstrate aspects of embodiments of the invention. Animated sequence 100 shows a model of a car 105 traveling along a path 110 between trees 115a and 115b and past a house 120. Although shown in two-dimensions for clarity, embodiments of the invention are intended for use with both two-dimensional and three-dimensional computer graphics models and animation.

Figure 2A:
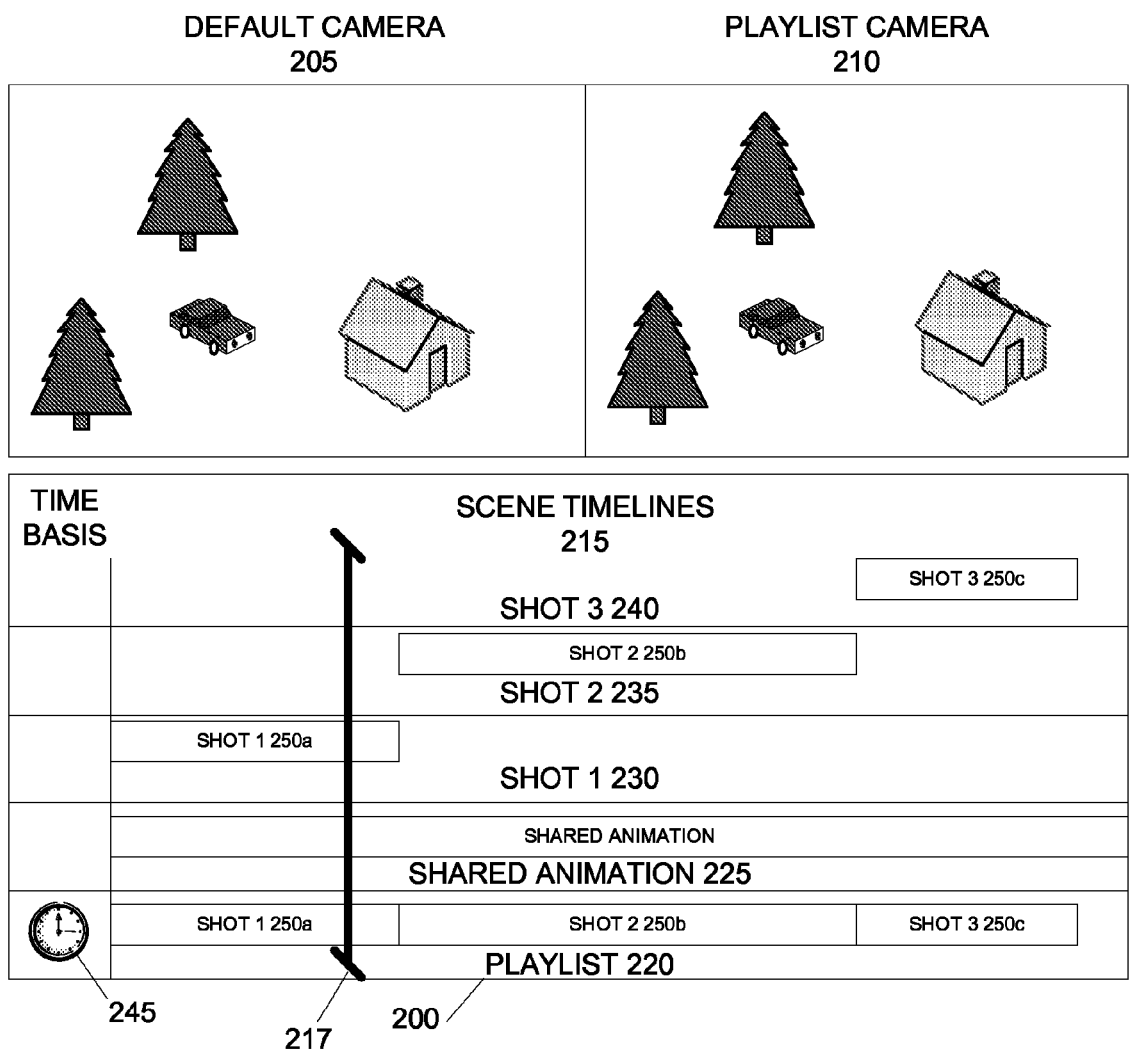
FIGS. 2A-2E illustrate an example animation tool interface demonstrating the use of multiple opinions of time according to an embodiment of the invention.

FIGS. 2A-2E illustrate an example animation tool interface demonstrating the use of multiple opinions of time according to an embodiment of the invention. FIG. 2A illustrates an example animation tool interface 200 including a default camera view 205 and a set of scene timelines 215. The default camera view 205 provides a rendered viewpoint of a scene from a default camera viewpoint. Typically, the default camera view 205 is configured to give an overview of the entire scene.

The set of scene timelines 215 illustrate the arrangement of shots and scene components as a function of time for a sequence of shots. The set of scene timelines 215 includes a playlist timeline 220. The playlist timeline 220 illustrates the arrangement of shots according to a time reference. As discussed in detail below, the time reference may be the time reference of a sequence, the time reference of a common or shared animation; or a time reference of a specific shot.

The set of scene timelines 215 may also include one or more additional timelines, representing the shots and scene components associated with a sequence. In this example, the additional timelines include a shared animation timeline 225, representing a shared animation used by one or more shots in the sequence; a shot 1 timeline 230, representing scene components specifying a first shot in the sequence; a shot 2 timeline 235, representing scene components specifying a second shot in the sequence; and a shot 3 timeline 240, representing scene components specifying a third shot in the sequence. (In this example, the terms first, second, and third shots are not intended to imply any sequence other than that explicitly specified by editing data.)

The interface 200 also includes a playlist camera view 210. The playlist camera view 210 presents a rendered viewpoint of the scene from the camera viewpoint specified by the playlist timeline 220 at a given time. A time cursor 217 illustrates the current time selected on the playlist timeline 220 and the corresponding times in other timelines. In an embodiment, a user can "play" the sequence, causing the time cursor 217 to scroll across the playlist timeline 215. As the time cursor 217 moves across playlist timeline 220, the default camera view 205 and the playlist camera view 210 are updated to reflect the position, orientation, and other attributes of the scene components at the time shown by the time cursor 217 in the playlist timeline 220.

In the example of FIGS. 2A-2E, the shared animation timeline 225 represents the animation of the car between the trees and around the house for all three shots, as shown in FIG. 1. In an embodiment, time-dependent data, such as animation data or time-varying parameters, is specified with reference to one or more time scales. For example, the animation of the car may be specified by the values of one or more animation variables changing over time. In this example, the animation of the car is associated with a first time reference. The values of the animation variables used to animate the car are specified with a set of animation variable knots. Each animation variable knot specifies a value of an animation variable at a discrete moment of time, which is expressed in terms of the first time reference, referred to as the shared time reference.

Shot 1 timeline 230 represents camera and/or animation data defining a long shot or distant camera view of the scene. For example, shot 1 timeline 230 represents the camera parameters defining the long shot or distant view of the scene. Shot 1 timeline 230 may also represent any shot 1 specific animation or components, such as additional objects or effects added to shot 1. In this example, the camera parameters of shot 1, as well as any additional shot-specific components, are expressed in terms of a second time reference, referred to as the shot 1 time reference.

Similarly, the shot 2 timeline 235 represents camera and/or animation data defining a close-up camera view of the car as it passes the trees. The shot 3 timeline 240 represents camera and/or animation data defining a close-up camera view of the car as it passes the house. In this example, the camera parameters and optional shot-specific components of shots 2 and 3 are expressed in terms of third and fourth time references, respectively. These time references are referred to as the shot 2 and shot 3 time references, respectively.

As discussed above, two or more shots are often arranged into a sequence. In an embodiment, editing data, such as an edit decision list, defines the arrangement of two or more shots into a sequence. In an embodiment, the sequence defined by the editing data is expressed in terms of a fifth time reference, referred to as the sequence time.

An embodiment of the invention enables users to author and view data in different time sequences. In the example of FIGS. 2A-2E, there are five different time references: the shared animation time reference, the shot 1 time reference, the shot 2 time reference, the shot 3 time reference, and the sequence time reference defined by the editing data. In this example, data is authored in four different time references: the shared animation time reference, the shot 1 time reference, the shot 2 time reference, and the shot 3 time reference. Regardless of which time reference is used to create the data, any portion or all of the data may be viewed according to any of time reference defined within the data or externally by a user or application.

In an embodiment, the playlist timeline 220 illustrates the arrangement of shots according to a time reference. Any of the timelines of the set of timelines 215 may be set as the time reference for the playlist timeline 220. By default, the playlist timeline 220 has a time reference of the sequence time. When the shots are viewed according to the editing data, the data from the shared animation and each of the shots is converted to the sequence time reference for viewing.

When the playlist timeline 220 time reference is set to the sequence time, the playlist timeline 220 shows the arrangement of shots according the sequence time. In this example, the playlist timeline 220 shows a sequence of shot 1 250a, shot 2 250b, and shot 3 250c arranged consecutively. When the sequence of shots is placed, the playlist camera view 210 will first show the viewpoint of shot 1 250a, a long shot or distant camera view. The placement of shots 250a, 250b, and 250c are mirrored on timelines 230, 235, and 240, respectively.

Figure 2B:
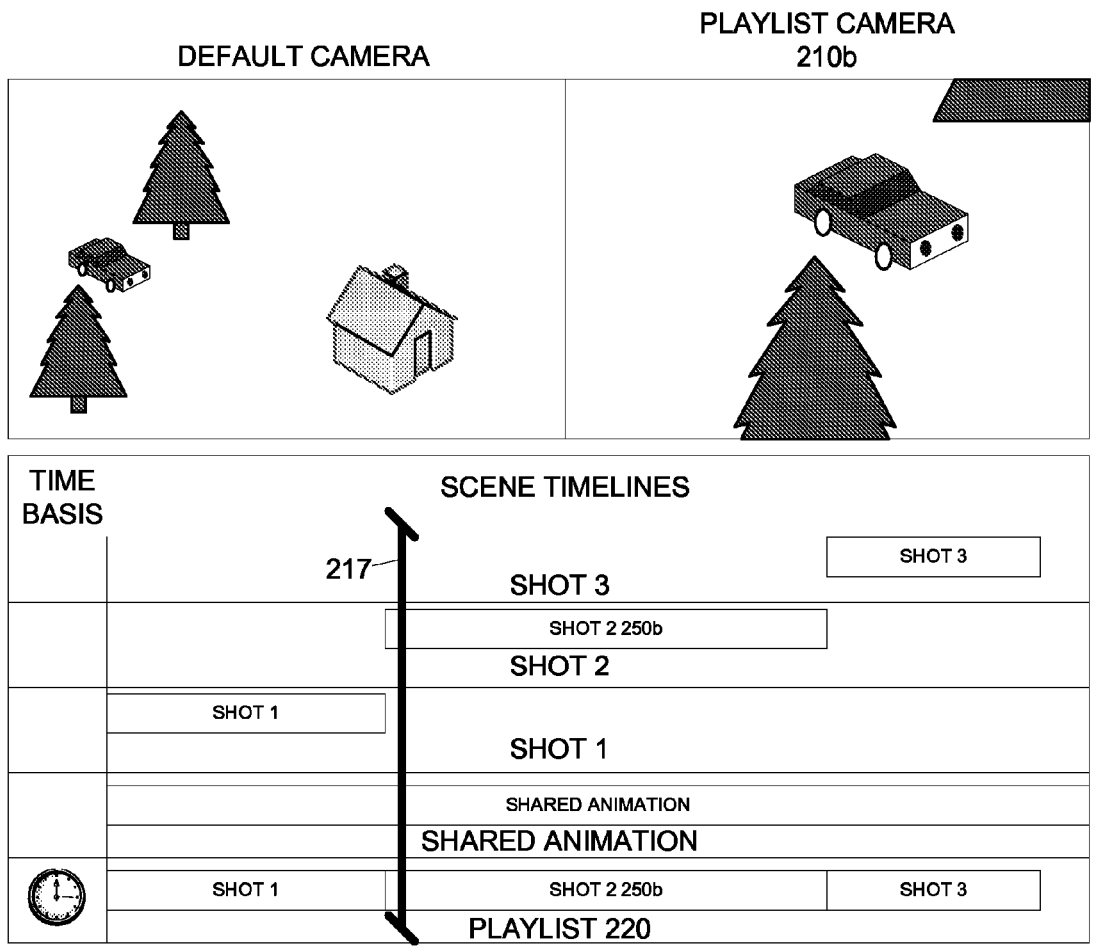
Figure 2C:
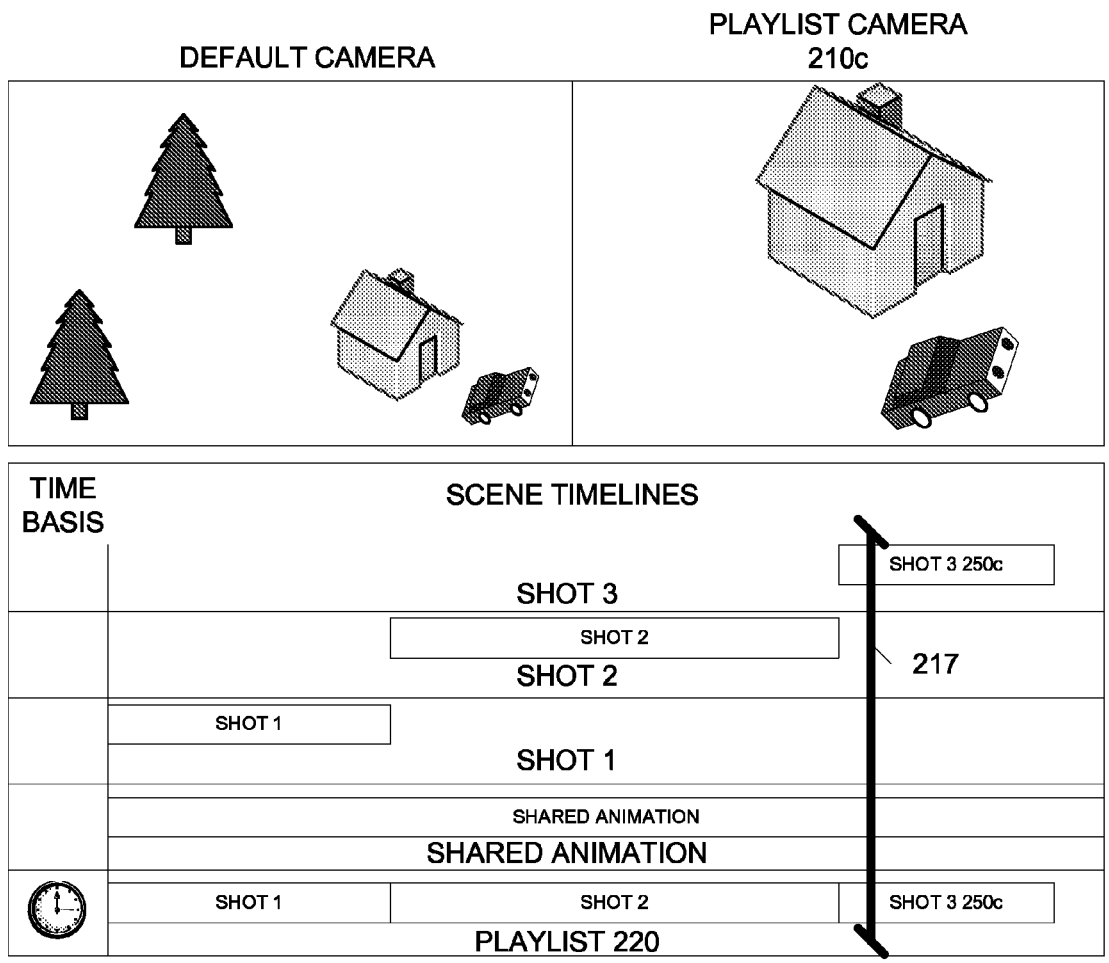

As shown in FIG. 2B, the playlist camera view 210b will show the viewpoint of shot 250b, a close-up view of the car as it passes between the trees, when the time cursor 217 is over shot 2 250b in the playlist timeline 220. Similarly, FIG. 2C shows the time cursor 217 over shot 3 250c in playlist timeline 220. At this point in time, the playlist camera view 210c shows the viewpoint of shot 3 250c, which is a close-up view of the car as it passes around the house.

Figure 2D:
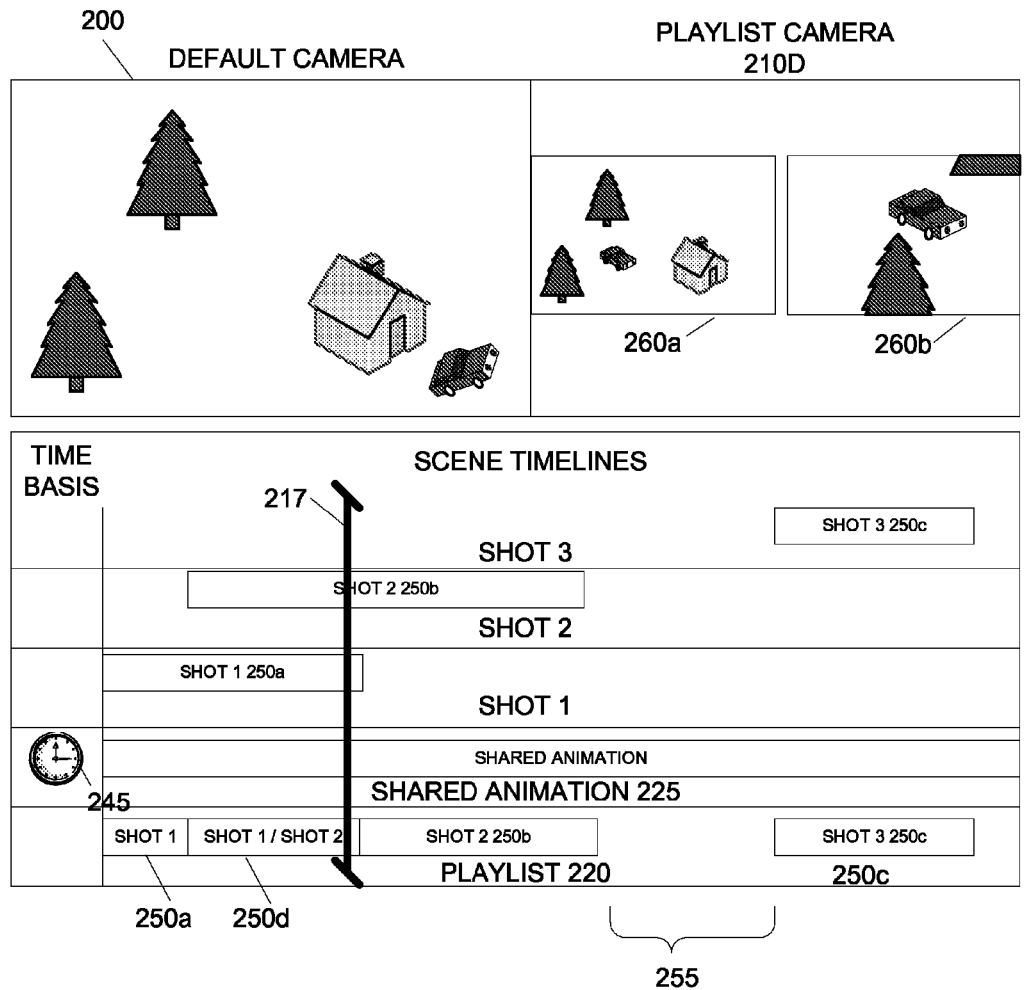

FIG. 2D shows the example interface 200 when the time reference of the playlist timeline 220 is changed to the shared animation timeline 225. In this example, the clock icon 245 is moved to the shared animation timeline 225 to indicate that that the time reference is set to the shared animation timeline 225. Thus, when the shots are viewed according to the shared animation time reference, the data from each of the shots as well as the editing data is converted to the shared animation time reference for viewing.

In this example, the shots specified by the editing data on the playlist timeline 220 have been rearranged according to the time reference of the shared animation 225. As shown by the shot 3 timeline 240, the third shot 250c uses animation from the end of the shared animation 225. Shots 1 250a and 2 250b use animation from the beginning of the shared animation sequence 225. As can be seen from the timelines 230 and 235, shots 250a and 250b overlap in time. This means that both shots show the shared animation 225 at the same time, albeit from different viewpoints and optionally with additional shot-specific animation and other attributes. This overlap is indicated in the playlist timeline 220 by the overlap shot indicator 250d. In an embodiment, if the time cursor 217 is in the overlap shot indicator 250d of playlist timeline 220, the playlist camera view 210d is split to show the camera viewpoints of the two or more shots overlapping at this time, such as shots 260a and 260b corresponding with shots 250a and 250b.

Additionally, gap 255 in the playlist timeline 220 indicates that none of the shots use the shared animation 225 during this time period.

Figure 2E:
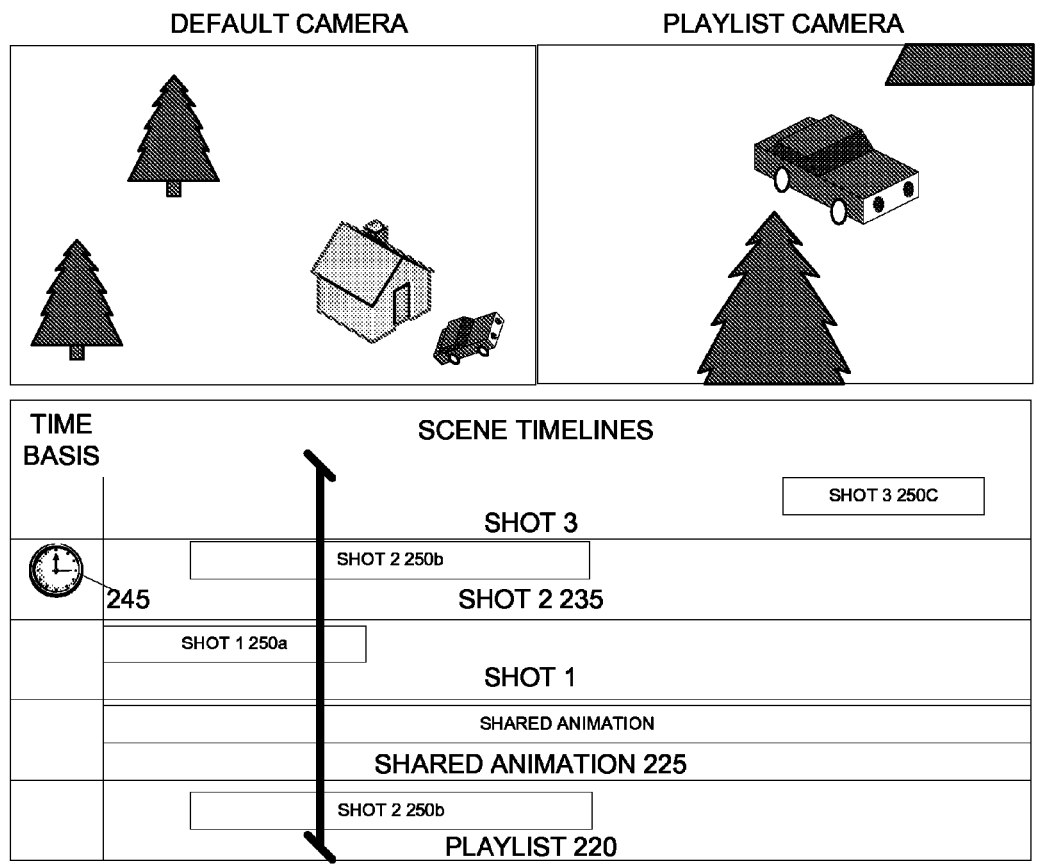

FIG. 2E shows the example interface 200 when the time reference of the playlist timeline 220 is changed to a shot time. In this example, the time reference of the playlist timeline 220 is changed to a shot time of shot 2 250b, as indicated by the clock icon in the shot 2 timeline 235. The playlist timeline 220 shows shot 2 250b. Shots 1 250a and 3 250c are not shown in the playlist timeline 220, because these two shots have their own shot time references that are independent of the shot time of shot 2 250b. Thus, shots 1 250a and 3 250c are undefined for the shot times of shot 2 250b. However, because the shared animation 225 is incorporated into shot 2 250b, the time of shared animation 225 is related to the shot time of shot 2 250b, for example by a time transformation, such as a time offset, a time scaling factor, and/or a non-linear transformation. Thus, the shared animation data represented by timeline 225 will be converted to the shot 2 time reference and shown in conjunction with shot 2 250b.

Similarly, if the time reference is changed to the shot time of shot 3 or to any other arbitrary time reference, the shared animation data represented by timeline 225 will be converted to this time reference and presented to the user or another application for processing.

In general, time references are related to each other by time transformations. A time transformation specifies the relationship between two or more time references. A time transformation may be a linear transformation, such as a time offset and/or scaling factor between one time reference to another time reference, or may include non-linear transformations, such as curves or discontinuities mapping one time reference to another time reference. Additionally, time transformations may be combined or concatenated to specify complicated relationships between time references. For example, a first time reference may by specified relative to a second time reference, which in turn is specified relative to a third time reference. A first time transformation between the first time reference and the second time reference may be combined with a second time transformation between the second time reference and the third time reference to specify a third time transformation between the first time reference and the third time reference.

In an embodiment, users can edit data viewed in with any time reference. In this embodiment, any edits to data will be converted back to the original time reference associated with the data and used to update the data in its original time reference. For example, in FIG. 2D, if a user modifies the car animation shown in the playlist window 260b for shot 2, an embodiment of the invention will convert this edit to the shared animation time reference originally used to specify the car animation. The car animation data represented by the shared animation timeline 225 will then be updated with this edited data. Because this embodiment updates data in its original time reference, any changes made to the shared animation data in a specific shot, such as shot 2, will automatically propagate to any other shots that use this same data, such as shot 1.

Computer graphics images, animations, and other productions involving computer graphics, such as interactive entertainment software, are created from a number of different components. Generally, components include any data and instructions used to create products and applications that include computer graphics. Components can include three-dimensional models of geometry; texture maps, other arrays of data, lighting, and shading programs used to determine the visual appearance of models; and animation data and deformer functions used to specify changes and motion over time. One or more components are typically stored as a digital asset. A digital asset can be a file, database table, executable program or script, or any other type of persistent data store.

Figure 3:
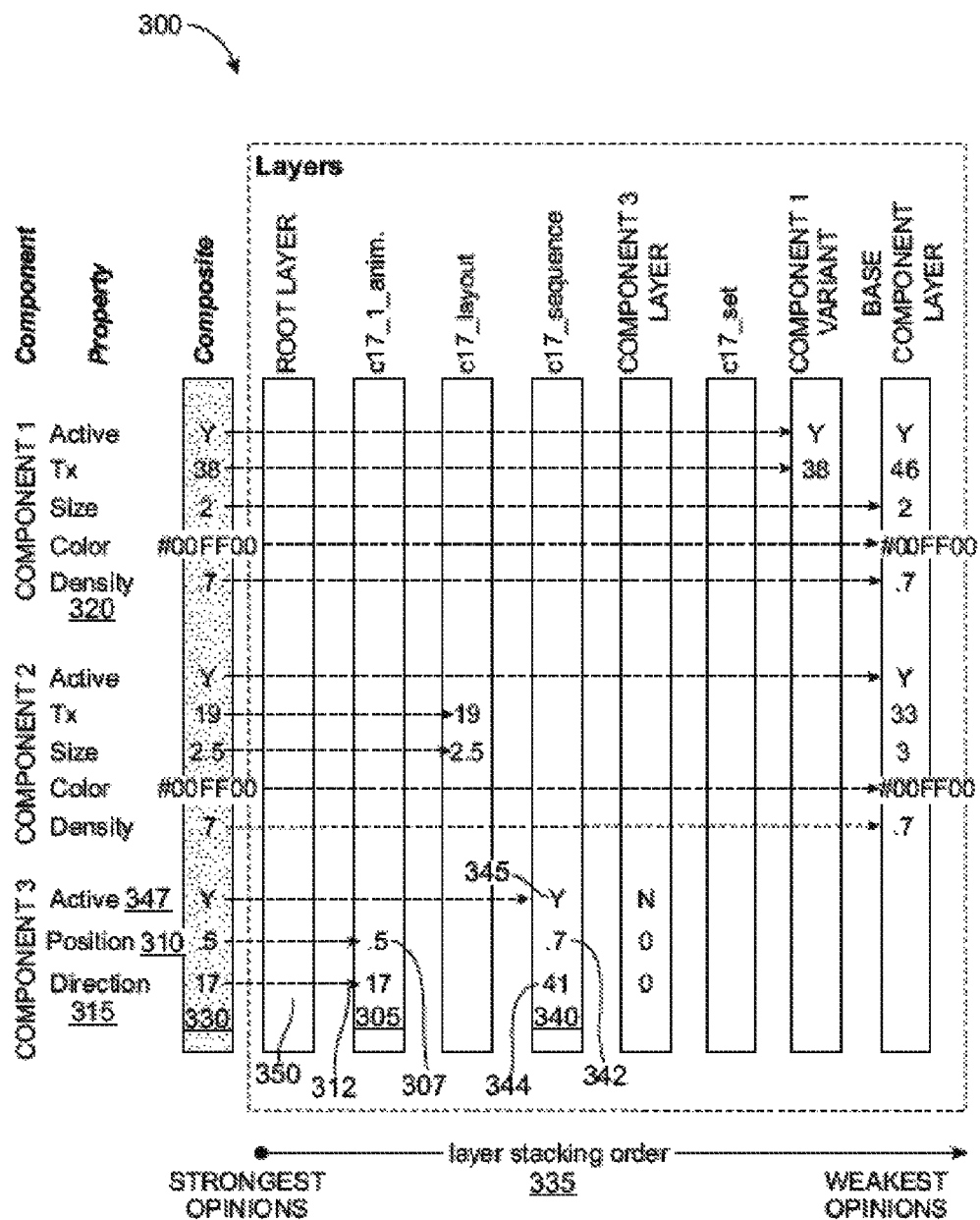
FIG. 3 a system for creating, modifying, and accessing components in a digital production pipeline according to an embodiment of the invention.

Embodiments of the invention can utilize layer data structures to specify the components of shots. FIG. 3 illustrates a layers data structure 300 specifying attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers. Additionally, an embodiment of the layers data structure may specify a time offset and/or time scaling value Each layer may be sparsely populated—that is, a layer does not have to include every component in a scene and, moreover, a layer does not have to include opinions for the values of every attribute of any component. Each layer can specify an opinion of value for a new attribute of a component without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 300, layer 305 includes an opinion 307 that the position attribute 310 of component 3 should be set to a value of 0.5 and an opinion 312 that the direction attribute 315 of component 3 should be set to a value of 37. As can be seen in this example, the opinions of value of other attributes, such as the density attribute 320 of component 3 is undefined in layer 305.

In the above example, attribute values are numerical parameters. However, embodiments of layer data structure 300 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to composite the values.

For example, a first layer can specify a model of a character wearing a hat. One attribute of the hat could be its type, such as "sombrero." Thus, the first layer could set a "hat type" attribute of the component to a value of "sombrero." Thus, from the view of the first layer, the character model should have a sombrero. A second layer that is higher or stronger than the first layer could change the hat type attribute of the component from "sombrero" to "top hat." Thus, from the view of the second layer, the character model should have top hat. A third layer that is higher or stronger than the second layer could specify that a color attribute of the hat should be "purple" and a material attribute should be "felt." Thus, from the view of the third layer, the character should have a purple felt top hat. In this example, each layer expresses an opinion of one or more attribute values in terms of the semantics associated with each attribute.

Furthermore, a component may include a reference to another component defined by one or more layers. For example, a Hat component of a character model can be a reference to a specific model of a hat. Thus, when reference is set to a "sombrero" component, the character model includes a model of a sombrero. When the reference is overridden by a layer to a "top hat" component, the character model is changed to include a model of a top hat. Each of these models can be defined by one or more layers, the attributes of which can be wholly or partially or overridden by other layers as described above.

The complete authored state of one or more components in one or more scenes at a given point of the digital production pipeline is determined by compositing all of the layers associated with a given point to produce a composite layer 330. The composite layer 330 includes opinions of attribute values for the attributes specified by one or more of the associated layers. The composite layer 330 can also be referred to as a composite scene description.

In an embodiment, a layer stacking order 335 determines the order in which layers are composited. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 335 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 350, which is by default the strongest or highest level layer.

In example layer data structure 300, layer 340 includes opinions 342 and 344 of the value of attributes 310 and 315. However, stacking order 335 places layer 305 as stronger than or ahead of layer 340. Thus, in the composite layer 330, the opinions of value 307 and 312 of layer 305 for attributes 310 and 315 will override corresponding opinions 342 and 344 in layer 340. However, as layer 305 does not define an opinion of value for attribute 347 of component 3, the opinion 345 in layer 340 will define the value of attribute 347 in the composite layer 330.

Figure 4:
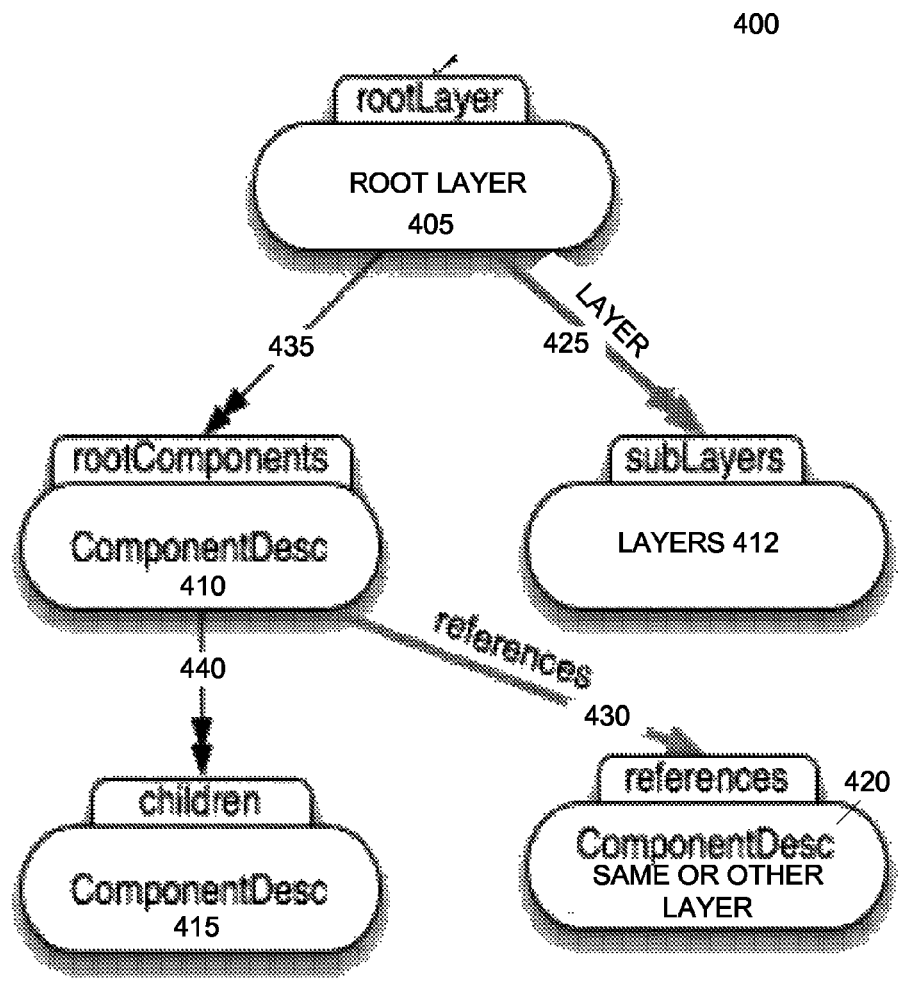
FIG. 4 illustrates a layers data structure specifying attributes of components according to an embodiment of the invention.

FIG. 4 illustrates a scene description data structure 400 representing the authored state of components in one or more scenes according to an embodiment of the invention. The authored state is the set of attribute values apart from any default or application-provided fallback attribute values for one or more components. The scene description data structure 400 specifies a graph or set of relationships between components as well as layer data structures specifying opinions of attribute values of components for one or more scenes. For a graph of relationships, components and layer data structures are referred to generally as nodes.

In an embodiment, the scene description data structure 400 combines two different aspects: a layer data structure, as described above, and cross-references to components. The layer data structure enables the progressive refinement and incremental modification of components as needed. The references to components enables the encapsulation and reuse of components. Together, this combination enables: scene modification at any point of the digital production pipeline, in any order, without any loss of data in upstream or downstream activities of the digital production pipeline; unrestricted and progressive modification and refinement of components; and a unified system of scene specification and modification that enables any aspects of the scene to be added, removed, reused, or modified at any point of the digital production pipeline.

In an embodiment, scene description data structure 400 specifies the relationships between components and layer data structures, which express opinions of component attribute values, in a hierarchical graph structure. Nodes of scene description data structure 400 may correspond with components, such as data representing geometry, texturing, shading, articulation, animation, simulation, layout, lighting, or rendering, or with layer data structures.

In an embodiment, the hierarchical graph structure includes three different types of relationships between components and layers: namespace relationships, layer relationships, and reference relationships. Namespace relationships establish the namespace or other nomenclature used to identify and organize components. Namespace relationships are used to assign components' identities, to match up components from different layers that should override each other, and to provide the scope of inclusion for references. Alternative embodiments can utilize other attributes, such as globally unique identifiers (GUIDs), to arrange components and layer data structures within the scene description data structure.

Layer relationships specify the relationship between a layer data structure and one or more sublayers. Layer relationships specify the layer stacking order used to composite or combine layers to determine attribute values of components.

Reference relationships provide links to components specified elsewhere. A reference relationship from a first component in a first layer data structure can reference a second component defined in the same layer data structure, a second component in another layer data structure associated with the first layer data structure, or a second component in another layer data structure that is not associated with the first layer data structure. Implementations of reference relationships can be restricted to directly referencing only the root component in another layer data structure (with any child components referenced implicitly using namespace relationships associated with the root component) or alternatively can be unrestricted to allow direct referencing of any arbitrary component in another layer data structure.

In an embodiment, the scene description data structure 400 includes a root layer 405 for the scene. In an embodiment, the relationships of the hierarchical graph between components and layer data structures are specified, at least in part, by root layer 405. Child nodes, such as root component 410 and sublayers hierarchy 412 can be directly associated with the root layer 405.

In an embodiment of the hierarchical graph, each non-empty layer data structure, including the root layer 405, includes at least one root component, such as root component 410. Additional components within the layer data structure are associated as child nodes (or grandchild or other descendant nodes) of the root component. As an example of this embodiment, one or more additional components 415 are associated via namespace relationships 440 as descendant nodes of root component 410.

In an embodiment, the namespace relationships 440 between component nodes in a layer are specified in the form of relationship attributes of components. For example, component 415 can include a parent attribute, which would be set to reference component 410. In another embodiment, a component can include a child relationship attribute specifying one or more child components of the component. For example, root component 410 can include a child relationship attribute, which would be set to reference components 415.

In an embodiment of the hierarchical graph, each additional layer data structure of the scene description data structure is a descendant, or sublayer, of the root layer. As an example of this embodiment, the root layer 405 is associated with one or more additional layer data structures 412 via layer relationships 425. In an embodiment, the arrangement of layer data structures 412 relative to the root layer 405 and each other specifies the layer stacking order used to combine and override opinions of component attribute values to form the composite layer. Although omitted for clarity, in an embodiment of the scene description data structure, each additional layer data structure that is not empty includes its own root component, similar to root component 410. Furthermore, sublayers can include additional components associated with their respective root components via namespace relationships.

In a further embodiment, reference relationships, such as reference relationship 430, provides a link to one or more components specified elsewhere. A reference relationship from a first component in a first layer data structure can reference a second, target component 420 defined in the same layer data structure, in another layer data structure associated with the first layer data structure, or in another layer data structure that is not associated with the first layer data structure. Implementations of reference relationships 430 can be restricted to target only the root component in another layer data structure (with any child components referenced implicitly) or alternatively can be unrestricted to directly referencing any arbitrary target component in another layer data structure.

In an embodiment, the graph, or set of relationships between components and layers, defined by the scene description data structure 400 can be orthogonal, or completely independent, of any other optional graphs associated with the same components. Graphs can be used to define different sets of relationships for the same components in different scenes. For example, a second scene description data structure can be created to specify different relationships between components for additional scenes. Additional layers included in the second scene description data structure can further specify different attribute values for the components.

In an embodiment, relationship attributes of components can also specify functional relationship between components. For example, relationships between coordinate transformation components can specify a specific sequence for applying transformations to models. In a further embodiment, relationship attributes can include additional data defining some parameter of a relationship. For example, a light source component can be related to a first model component, which indicates that the light source component provides light to the model component. The lighting relationship between these two components can further include a light intensity value to indicate the intensity of light from the light source on the first model. If a second lighting relationship is created between the light source component and a second model component, the second lighting relationship can include a different light intensity value.

Embodiments of the invention can utilize layer data structures to specify shots. Each shot may be comprised of one or more layer data structures. Additionally, if a layer has a child layer, such as a layer of shared animation data incorporated into a shot layer by a reference relationship, a time offset and/or time scaling value may specify the time relationship between the layers. For example, a shot layer could specify a positive or negative time offset of a child layer. This allows a shot layer to arbitrarily synchronize itself with any point of time of the animation and component attributes specified in a child layer. Additionally, the time scaling value allows the speed of animation in a child layer to be adjusted relative to a shot layer.

In an embodiment, editing data, such as edit decision lists, specifying the sequencing of shots or portions thereof, may be implemented in the form of a view or transformation of the data authored in one or more layers to a sequence time reference. The editing data may be provided by a user, external data, or another application.

In another embodiment, the editing information specifying the sequencing of shots or portions thereof, such as an edit decision list, may be implemented in the form of one or more layer data structures, with attributes specifying the cuts between shots.

Figure 5:
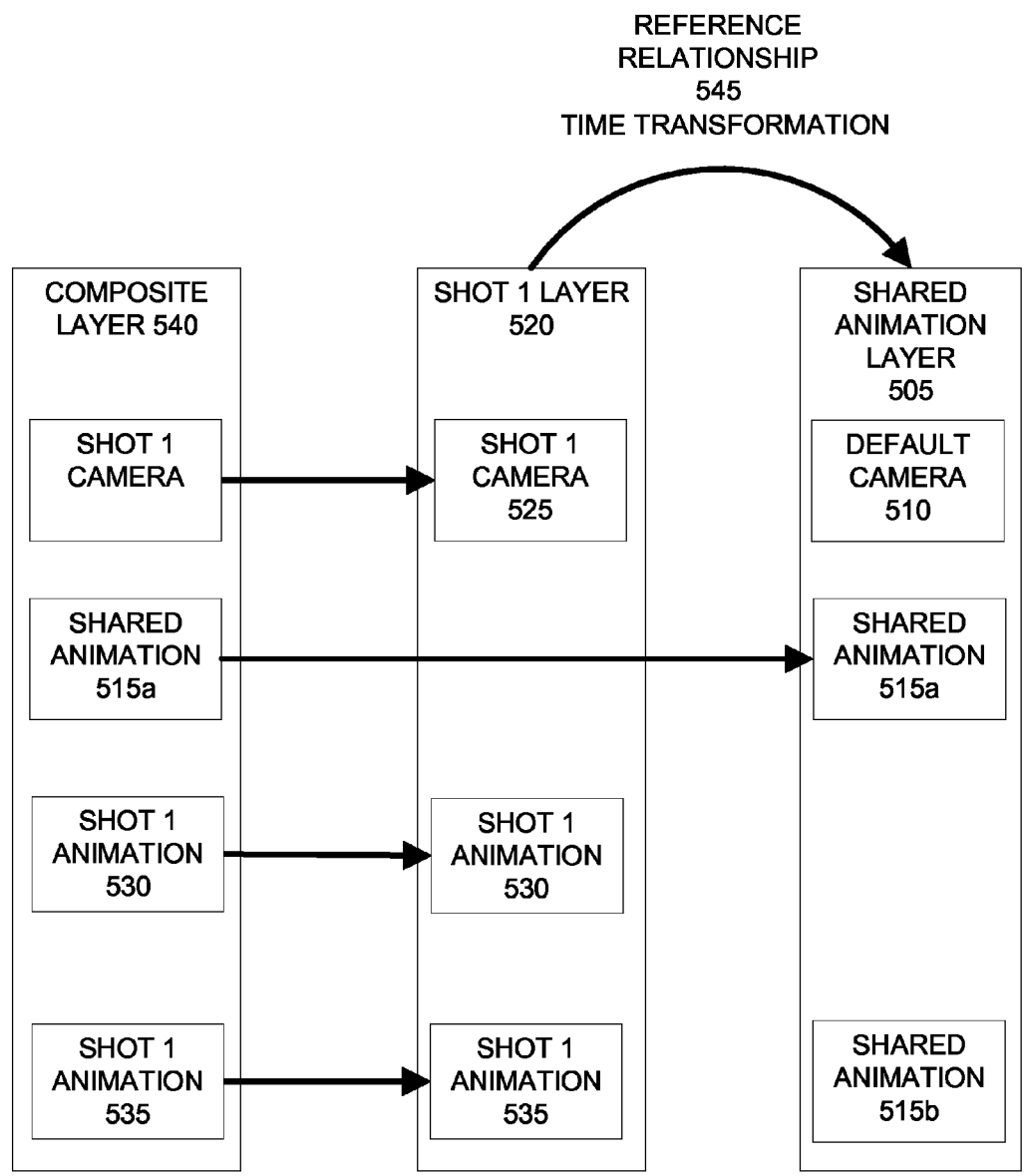
FIG. 5 illustrates a scene description data structure representing the state of a component according to an embodiment of the invention.

FIG. 5 illustrates an example set of layer data structures 500 used to specify an example animated sequence and shots according to an embodiment of the invention. The set of layer data structures 500 includes a shared animation layer data structure 505. The shared animation layer 505 includes a default camera component and attributes 510 and one or more shared animation components, such as animation components 515a and 515b.

A first shot, shot 1, is defined by one or more layers, such as shot 1 layer data structure 520. Shot 1 layer 520 includes a shot 1 camera component and attributes 525, which is adapted to override the default camera components and attributes 510 of the shared animation layer 505. Shot 1 layer 520 also includes shot-specific components and other attributes, such as shot 1 animation components 530 and 535. Shot 1 animation component 535 is adapted to override shared animation component 515b.

In an embodiment, an animation software application composites the layer data structures 505 and 520 to determine a complete specification of the components of shot 1. The composite layer data structure 540 for shot 1 includes the shot 1 camera component and attributes 525, the shared animation component 515a, and the shot 1 animation components 530 and 535.

In a further embodiment, the components in shared layer data structure 505 may be offset and/or scaled in time from the components shot 1 layer data structure 520, as specified by reference relationship 545.

Data may be edited with reference to any arbitrary time reference. In an embodiment, the source layer data structure that is associated with the previous version of this modified data will be identified. A time transformation between the time reference of the modified data and the time reference of the source layer data structure is then determined. This time transformation is applied to the modified data to transform it to the time reference of the source layer data structure. The source layer data structure is then updated with the transformed modified data.

Figure 6:
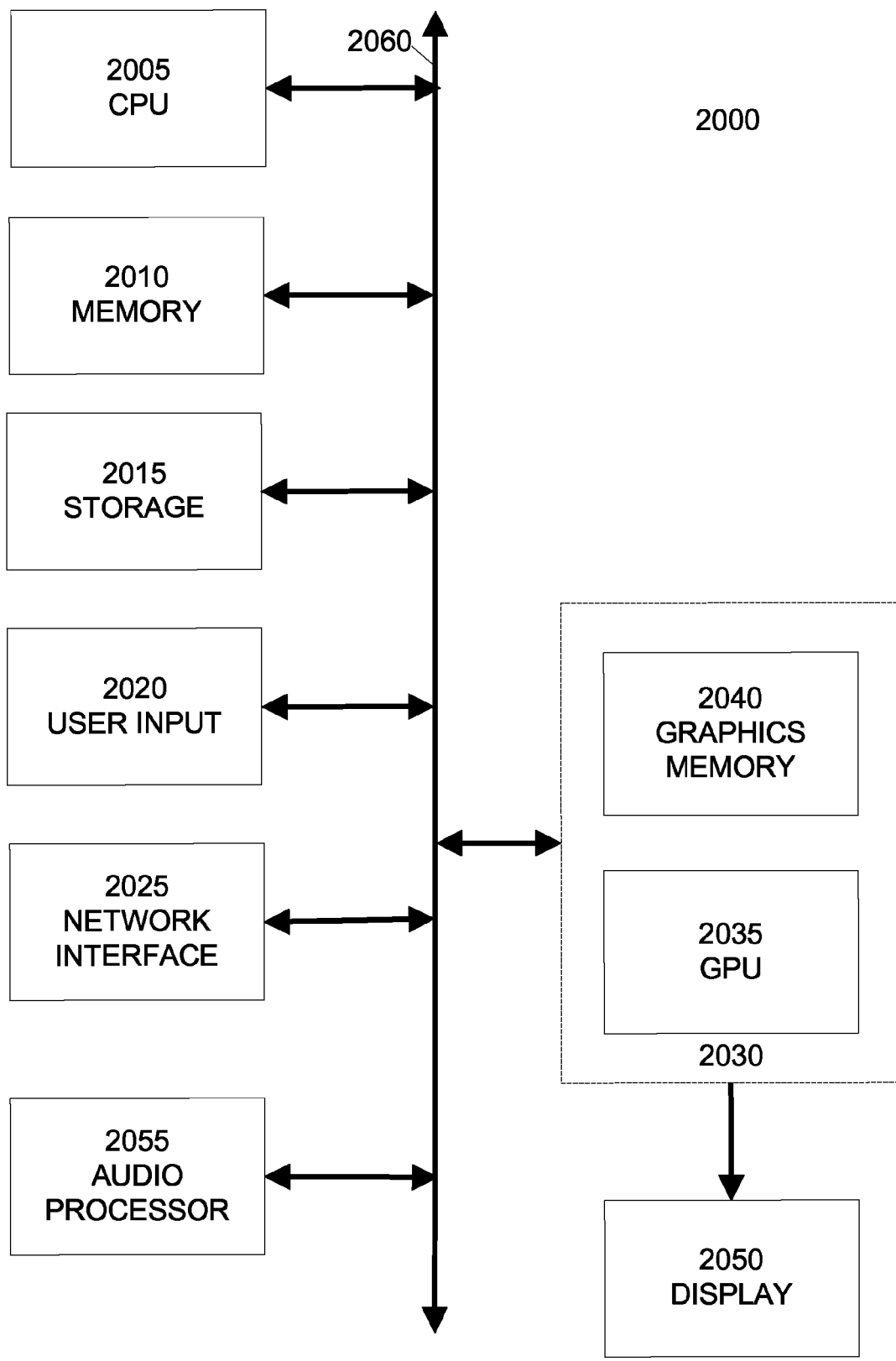
FIG. 6 illustrates an example computer system suitable for implementing embodiments of the invention.

FIG. 6 illustrates an example computer system 2000 suitable for implementing embodiments of the invention. FIG. 6 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of specifying time-dependent computer graphics data, the method comprising:

receiving a first layer data structure including first computer graphics data specified using a first time reference;

receiving a second layer data structure including second computer graphics data specified using a second time reference;

receiving a first layer relationship specifying a time relationship between the first and second layer data structures;

determining a time transformation specifying a relationship between the first time reference and the second time reference;

transforming the first computer graphics data using the time transformation to create transformed first computer graphics data specified using the second time reference;

compositing the second computer graphics data and the transformed first computer graphics data to create composite computer graphics data, wherein the composite computer graphics data includes the second computer graphics data and at least a portion of the transformed first computer graphics data, receiving a third layer data structure including third computer graphics data specified using a third time reference;

receiving a second layer relationship specifying a time relationship between the first and third layer data structures;

determining a second time transformation specifying a relationship between the first time reference and the third time reference;

transforming the first computer graphics data using the second time transformation to create additional transformed first computer graphics data specified using the third time reference; and compositing the third computer graphics data and the additional transformed first computer graphics data to create additional composite computer graphics data, wherein the additional composite computer graphics data includes the third computer graphics data and at least a second portion of the additional transformed first computer graphics data, wherein a first portion of the first computer graphics data corresponding with the portion of the transformed first computer graphics data included in the composite computer graphics data is different from a second portion of the first computer graphics data corresponding with the second portion of the additional transformed first computer graphics data included in the additional composite computer graphics data.

2. The method of claim 1, wherein compositing comprises:
creating a composite layer data structure including the composite computer graphics data.

3. The method of claim 1, further comprising:
receiving a modified version of fourth computer graphics data specified using the second time reference;
identifying a source layer data structure associated with a previous version of the fourth computer graphics data;
determining a third time transformation specifying a relationship between the second time reference and a time reference of the source layer data structure;

transforming the modified version of the fourth computer graphics data with the third time transformation to create a transformed modified version of the fourth computer graphics data specified using the time reference of the source layer data structure; and updating the previous version of the fourth computer graphics data in the source layer data structure with the transformed modified version of the fourth computer graphics data to create a modified fourth layer data structure.

4. The method of claim 1, further comprising:
receiving a fourth time reference;
determining a third time transformation specifying a time relationship between the second time reference and the fourth time reference;
transforming the composite computer graphics data to create transformed composite computer graphics data specified using the fourth time reference; and
presenting the transformed composite computer graphics data.

5. The method of claim 4, further comprising:
receiving an edit decision list including the fourth time reference.

6. The method of claim 4, further comprising:
receiving a fourth layer data structure including the fourth time reference.

7. The method of claim 1, wherein the time transformation includes a time offset between the first time reference and the second time reference.

8. The method claim 1, wherein the time transformation includes a scaling factor between the first time reference and the second time reference.

9. The method of claim 1, wherein the first time transformation includes a non-linear mapping between the first time reference and the second time reference.

10. The method of claim 1, wherein the first and second time references are each associated with at least one of group consisting of:
shared animation data; shot data; a layer data structure; sequence data; and an edit decision list.

11. The method of claim 1, wherein:
a first shot specified using the second time reference comprises the composite computer graphics data; and
a second shot specified using the third time reference comprises the additional composite computer graphics data.

* * * * *